United States Patent Office 3,094,278
Patented June 18, 1963

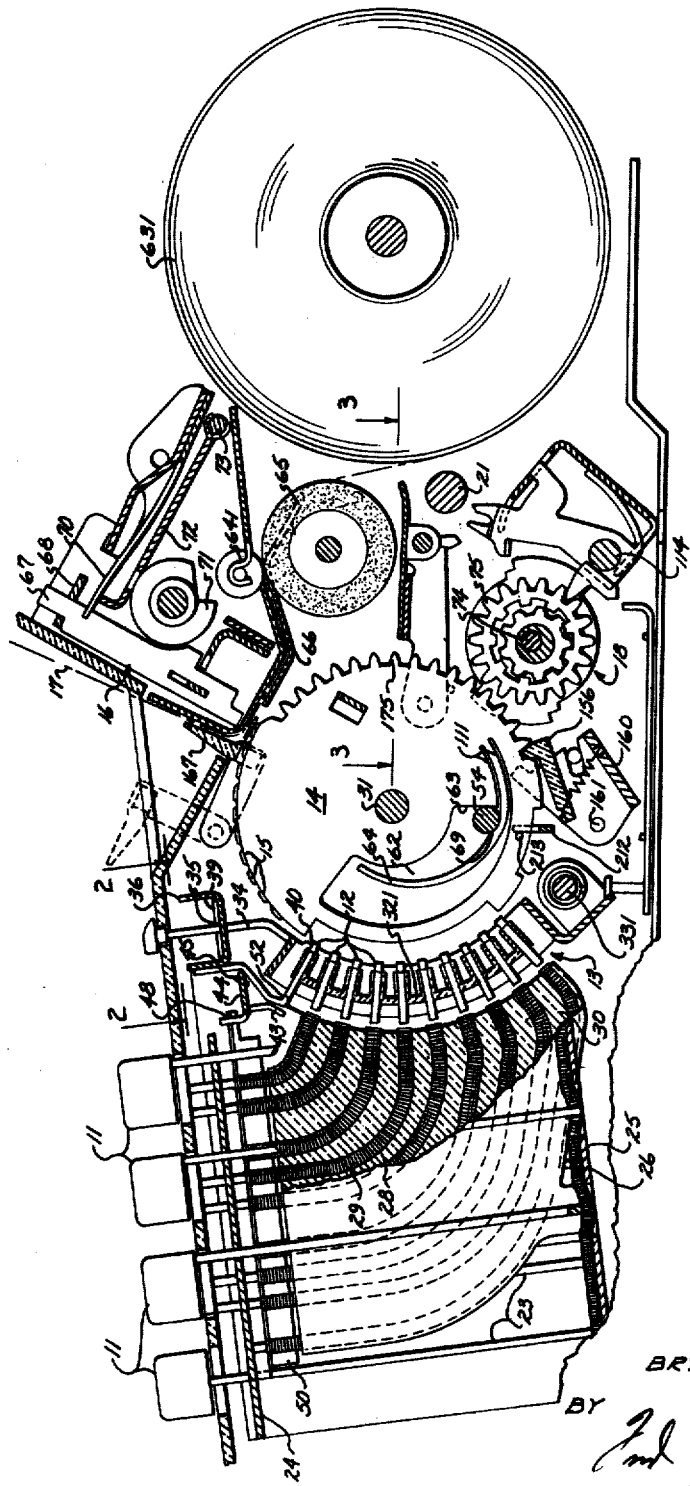

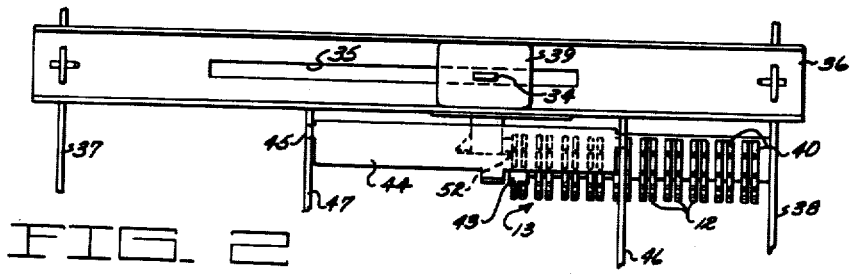
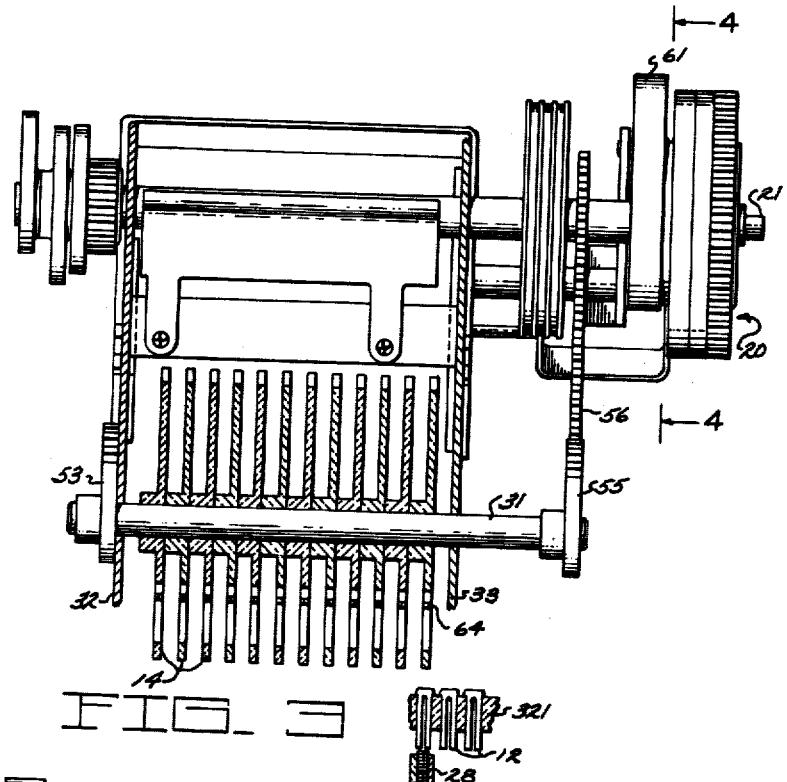
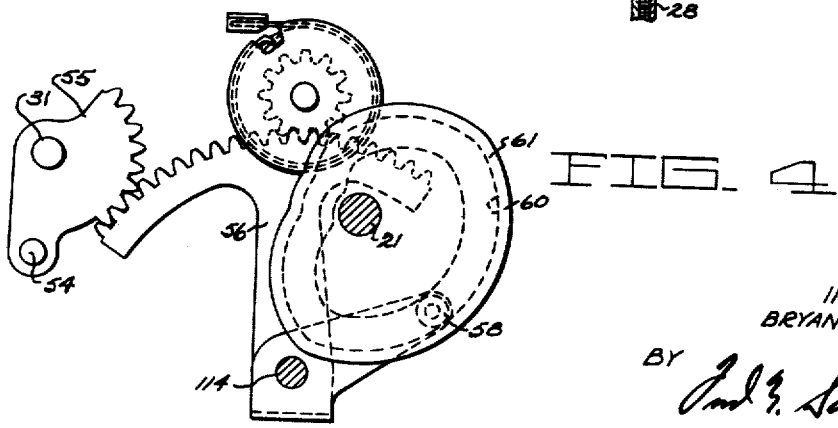

3,094,278
DETENT TYPE ACTUATOR FOR CALCULATING MACHINE
Bryan F. Kuhne, Monrovia, Calif., assignor to Clary Corporation, San Gabriel, Calif., a corporation of California
Filed Sept. 25, 1961, Ser. No. 140,544
4 Claims. (Cl. 235—60)

This invention relates to calculating and adding machines or the like and has particular reference to machines having actuators of the oscillatable rack or sector type wherein the actuators are yieldably advanced to different digit representing positions under control of value keys or stop elements set thereby.

Generally, in machines of the above type, the actuators have heretofore been driven through springs under control of a universal actuator or bail wherein the bail is operated through a uniform excursion during each cycle of the machine and the actuators may be arrested in different digit representing positions under control of value keys or elements controlled thereby.

Although such spring drive mechanisms work satisfactorily in most cases, the springs must, at certain times, depending on the positions in which the actuators are arrested, be stretched a maximum amount. Since most calculating and adding machines incorporate at least six and possibly as many as 14 denominationally arranged actuators and since the springs must operate properly when in their most collapsed conditions, the aggregate load applied by all actuator springs when stretched to their maximum may require an abnormally large power drive unit.

In order to reduce the power required and to overcome other problems inherent with spring-driven actuators, detent drive mechanisms such as that disclosed in the R. E. Boyden Patent 2,490,200, issued on December 6, 1949, have been used. Such drive mechanisms have proved superior to spring drive mechanisms, although heretofore they have required additional parts and necessitated spacing of the actuators sufficiently to accommodate such additional parts.

It therefore becomes a principal object of the present invention to reduce the number of parts in a detent type differential actuator drive mechanism.

Another object of the invention is to permit differential actuators driven by a yieldable detent mechanism to be spaced closely adjacent each other.

A further object of the invention is to provide a differential actuator unit which is more economical to manufacture and assemble than previous units of this nature.

The manner in which the above and other objects of the invention are accomplished will be readily understood on reference to the following specification when read in conjunction with the accompanying drawings, wherein:

FIG. 1 is a longitudinal sectional view through an adding machine embodying a preferred form of the present invention.

FIG. 2 is a sectional plan view illustrating part of the pin carriage and is taken substantially along the line 2—2 of FIG. 1.

FIG. 3 is a sectional plan view through the actuators and associated mechanism and is taken substantially along the line 3—3 of FIG. 1.

FIG. 4 is a sectional side view of the actuator drive mechanism and is taken along the line 4—4 of FIG. 3.

Although the invention is disclosed as associated with a ten-key adding-listing machine, it should be understood that the same could be equally well associated with other types of machines of this general class.

Digits of a value are entered sequentially through ten depressible amount keys 11, ranging in value from 0 to 9. Depression of an amount key sets an appropriate stop pin 12 in a pin carriage, generally indicated at 13, which shifts laterally of the machine into cooperative relation with combined differential actuators and printing sectors 14 preferably formed of a resilient plastic material.

The amount keys 11 are mounted on key stems 23 slideable vertically in slots provided in upper and lower key frame plates 24 and 25, respectively, the latter forming part of the framework of the machine. Tension springs 26 attached at their ends to the lower frame plate 25 extend under the key stems to normally hold the amount keys in raised condition.

Each key stem has an extension attached to the upper end of a flexible cable 28. The various cables are vertically aligned with each other and are slideably mounted for endwise movement in grooves 29 formed in a guide-block 30 suitably attached to the lower frame plate 25. The various cables terminate in an arcuate pattern concentric with a shaft 31 which is rotatably mounted in bearings formed in side frame plates 32 and 33 (FIG. 3) forming part of the machine framework.

The pin carriage 13 is formed of an arcuate body 321 and is slideably mounted at its lower end on a stationary rod 331 which extends across the machine and is suitably supported by frame plates 37 and 38 also forming part of the machine framework. The pin carriage has an extension 34 at its upper end which extends through a slot 35 (FIG. 2) formed in a channel member 36 secured at its ends to the frame plates 37 and 38. A slide 39 attached to the extension 34 is guided by the channel member 36 to likewise guide the upper end of the pin carriage across the machine.

The pin carriage has a plurality of vertical columns of stop pins 12 therein extending radially of the shaft 31 and slideable endwise in slot formed in the pin carriage body 321. The stop pins are located in horizontal rows aligned with the lower ends of the flexible cables 28. Thus, upon depression of a selected amount key, the respective cable 28 will be moved endwise to likewise move an aligned stop pin from its normal ineffective position shown in FIG. 1 to a position wherein it forms an abutment in the path of a shoulder 41 formed on each of the sectors 14.

An additional row of escapement pins 40 are provided above the remaining pins 12. Such pins are aligned with the various vertical columns of pins 12 and are likewise slideably mounted in slots formed in the pin carriage body 321 for endwise movement by a finger 43 of a bail 44 which is pivotally supported at 45. The bail is pivotally connected at 48 to a second bail 50 which is pivotally supported in a manner not shown for movement about an axis extending longitudinally of the machine. The bail 50 is actuated by each of the amount keys 11 upon depression thereof.

Spring means (not shown) urges the pin carriage to the left in FIG. 2 whereupon one of the escapement pins 40 abuts a shoulder 52 formed on a depending extension of the channel member 36.

Thus, upon depression of any amount key to set an appropriate stop pin 12, the bails 50 and 44 are actuated to depress an aligned pin 40 whereby the pin carriage may escape one column to the left.

Near the completion of a machine cycle, means (not shown) return the pin carriage to the right into its position shown in FIG. 2 wherein the left-hand column of pins therein is aligned with the ends of the cables 28. During such movement, the pins 12 move over a stationary cam (not shown) which returns the same to their normal ineffective positions as illustrated.

The pin carriage is disclosed in detail and claimed in the copending application of K. F. Oldenburg et al., Serial No. 140,549, filed September 25, 1961, for "Calculating Machine."

The sectors 14 cooperate with a printing mechanism, generally indicated at 16, to print amounts registered by the sectors onto a paper strip 17. For this purpose, each sector carries a series of type characters 15 on its periphery, ranging in value from 0 to 9, the character 0 being located at the clockwisemost location relative to the rest of the series.

The paper strip 17 is fed from a supply roll 631 between gripping feed rolls 65 and 641 and through a guideway 66, past a printing station located between the sectors 14 and respective hammers 67. From such station, the strip is passed upwardly behind a transparent tear-off bar 167.

The hammers are suitably guided in a frame 68 for endwise movement radially of the sectors 14, toward and away from contact with the paper strip 17. Leaf spring elements 70 urge the hammers downwardly but are normally restrained by a rotatable cam 71 which operates through a follower bail 72 pivoted at 73 to normally hold the spring elements and hammers in an upper position.

The cam 71 is suitably entrained through gearing (not shown) with a cyclically operable main drive shaft 21 so that during the printing phase which occurs after the sectors 14 have been yieldably driven clockwise until arrested by set ones of the pins 12 or by different accumulator elements during totaling and subtotaling operations, the cam 71 permits the springs 70 to impel the hammers 67 downwardly, thus causing an imprint of selected type characters 15 onto the strip 17 through a suitable printing ribbon.

The above printer and associated mechanism is disclosed in detail and claimed in the copending application of H. L. Clary et al., Serial No. 140,336, filed September 25, 1961, for "Calculating Machine."

The sectors 14 are also effective to differentially actuate an accumulator, generally indicated at 18. The latter is of the crawl carry type and is disclosed in detail and claimed in the copending application of R. E. Busch, Serial No. 130,078, filed August 8, 1961, for "Calculating Machine." The accumulator, in general, comprise denominationally arranged gears 75 and other elements rotatably mounted on an accumualtor shaft 74. Normally, the accumulator is held in a lower position, as shown in FIG. 1, wherein the accumulator gears 75 are located out of mesh with gear sections 175 formed on respective ones of the sectors 14.

During a digitizing phase of a machine cycle, the accumulator is raised to mesh the gears 75 with the sectors 14 so as to transfer digital amounts from the sectors 14 into the accumulator. Likewise, during totaling and subtotaling operations, the accumulator is raised to mesh with the sectors for the purpose of transferring amounts from the accumulator to the sectors so that such amounts may be printed.

In accordance with the present invention, the various sectors 14 are yieldably advanced clockwise from their home positions illustrated in FIG. 1 by a bail rod 54. The latter is mounted at its opposite ends on gear sectors 53 and 55 (FIGS. 3 and 4) attached to opposite ends of the shaft 31. Sector 55 meshes with a second gear sector 56 pivoted on a shaft 114 and carrying a cam follower roller 58 which engages a cam groove 60 formed in the side of a cam 61 which is suitably attached to a cyclically operable drive shaft 21. The latter is driven one complete rotation during each cycle of the machine through a clutch generally indicated at 20.

The bail rod 54 extends through arcuate openings 62 formed in the sides of the various printing sectors 14 and is normally engaged by detenting shoulders 69 formed on yieldable tails 64 extending integrally from the sides of the sector into their openings 62.

It will be noted that when a sector is in its home position, the bail rod 54 lies closely adjacent an edge 63 of its opening 62. Also, in such position, a pin 213 on each sector lies closely adjacent a stationary comb plate 212 extending across the machine.

Each tail 64 lies at least substantially coextensive with the side of its sector 14, as will be seen in FIG. 3, and extends mainly in an arcuate curve which converges toward the shaft 31. In order to obtain sufficient resiliency adjacent the shoulder 69, the tail is extended counterclockwise beyond the edge 63 by forming arcuate slits 111 in the side of the sector.

Thus, as the bail rod 54 is moved in a clockwise direction, it will drive each of the sectors 14 through the shoulders 69 until each sector is arrested by a set stop pin 12 or by an associated accumulator element (in totaling and subtotaling operations) at which time the rod will deflect the detent shoulder 69 and will move along the outer portion of the tail 64, causing it to yield outwardly. The resultant frictional engagement of the bail rod with the tail 64 will tend to prevent the sector from rebounding from an arrested position and will also prevent the sectors from being moved counterclockwise before return of the bail rod due to any possible unwanted vibrations or other forces developed during operation of the machine.

After the printing phase of the cycle, the bail rod 54 will be returned counterclockwise by the cam 61 and the frictional engagement between the tails and the bail rod will normally be sufficient to drive the sectors counterclockwise toward their home positions where the pins 213 will engage the comb plate 212. Thereafter, the bail rod will slide along the tails 64 until it comes to rest behind the detent shoulders 69.

However, if unwanted binding or frictional forces should prevent the bail rod from first frictionally driving a sector toward its home position, the latter will slide along the tail 64 until it strikes the edge 63, at which time it will become effective to positively return the sector.

In order to ensure proper alignment of the sectors 14 during the printing operation and to ensure proper meshing of the accumulator gears therewith, an aligner 156 is provided which is carried by a bail 160 pivotally supported at 161.

Actually, the aligner 156 is effective to retract the sectors counterclockwise slightly, i.e., approximately 2°, beyond the zero positions to which they are retracted by the bail rod 54 when moved to their home positions. In such position, the detent shoulders 69 are deflected slightly, causing the same to exert a clockwise urge against the sectors.

By virtue of the fact that the tails 64 lie at least substantially coextensive with the sides of the sectors 14, the sectors may be placed side-by-side in close proximity to each other. However, as shown in the present disclosure, the sectors are spaced apart distances determined by the desired spacing between the printed type characters, leaving space between such sectors for location of other operating devices therebetween.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. In a calculating machine having a shaft and selectively settable stop members, differential actuators comprising a plurality of gear elements rotatably mounted on said shaft, said gear elements having stop shoulders engageable with set ones of said stop members whereby to differentially arrest said gear elements in different positions about the axis of said shaft, each of said gear elements having an opening therein and a flexible tail portion extending into said opening; a bail extending through said openings of said gear elements, means supporting said bail for movement about said axis, each of said gear elements and a respective one of said tail portions being formed of a single piece of plastic material, said tail portion having a detenting shoulder thereon normally engaging said bail whereby to transmit rotation between said bail and said gear element, said tail portion being adapted to yield radially of said gear element upon said arrestment of said gear element whereby said bail can move beyond said detenting shoulder, and said tail portion extending along the path of travel of said bail whereby to yieldably and radially engage said bail in different arrested positions of said gear element.

2. In a calculating machine having a shaft, differential actuators comprising a plurality of gear elements rotatably mounted on said shaft independently of each other, said elements each having an opening therein, a bail extending through said openings and rotatably mounted for movement about the axis of said shaft, and means for oscillating said bail about said axis, each of said gear elements having a flexible tail portion extending integrally therefrom into said opening, said gear element and said tail portion being formed of a single piece of plastic material, said tail portion provided with a detening shoulder normally engaging said bail whereby to transmit rotation between said bail and said gear elements, said tail portion being effective to yield radially of said gear element upon said arrestment of said gear element whereby said bail can move beyond said detenting shoulder.

3. In a calculating machine having a shaft, differential actuators comprising a plurality of gear elements rotatably mounted on said shaft independently of each other, said elements each having an opening in the side thereof, a bail extending through said openings and rotatably mounted for movement about the axis of said shaft, means for oscillating said bail about said axis, means for differentially limiting the movement of said actuators about said shaft, each of said gear elements having a flexible tail portion extending integrally therefrom into said opening, said gear element and said tail portion being formed of a single piece of plastic material, said tail portion yieldably pressing against said bail substantially at right angles to the direction of movement of said bail in all positions of said gear element relative to said bail, and a detenting shoulder on said tail portion normally in driving engagement with said bail, said tail portion yielding substantially at right angles to the direction of movement of said bail upon said arrestment of said gear element whereby said bail can move beyond said detenting shoulder.

4. In a calculating machine, a differential actuator comprising a rotatable gear element and an elongate flexible tail portion integral at one end thereof with said gear element, said gear element and said tail portion being formed of a single piece of plastic material, means supporting said gear element for pivotal movement about an axis, a bail, means for moving said bail about said axis, and means for selectively differentially arresting said gear element in different positions, said tail portion extending along the path of travel of said bail and effective to yieldably press against said bail substantially radially of said gear element whereby to frictionally couple said gear element to said bail in different positions of said bail relative to said gear element.

References Cited in the file of this patent
UNITED STATES PATENTS

| 2,277,498 | Mehan | Mar. 24, 1942 |
| 2,832,530 | Chall | Apr. 29, 1958 |
| 2,880,933 | Westinger et al. | Apr. 7, 1959 |
| 2,988,274 | Carlsen et al. | June 13, 1961 |

UNITED STATES PATENT OFFICE
CERTIFICATE OF CORRECTION

June 18, 1963

Patent No. 3,094,278

Bryan F. Kuhne

It is hereby certified that error appears in the above numbered patent requiring correction and that the said Letters Patent should read as corrected below.

In the grant, lines 2 and 3, for "assignor to Clary Corporation, of San Gabriel, California, a corporation of California," read -- assignor, by mesne assignments, to Addmaster Corporation, of San Gabriel, California, a corporation of California, --; line 12, for "Clary Corporation, its successors" read -- Addmaster Corporation, its successors --; in the heading to the printed specification, lines 4 to 6, for "assignor to Clary Corporation, San Gabriel, Calif., a corporation of California" read -- assignor, by mesne assignments, to Addmaster Corporation, San Gabriel, Calif., a corporation of California --.

Signed ans sealed this 31st day of December 1963.

(SEAL)
Attest:
ERNEST W. SWIDER
Attesting Officer

EDWIN L. REYNOLDS
Acting Commissioner of Patents